United States Patent
Dowd et al.

(10) Patent No.: US 7,646,953 B2
(45) Date of Patent: Jan. 12, 2010

(54) FIBER OPTIC CABLE SYSTEMS AND METHODS TO PREVENT HYDROGEN INGRESS

(75) Inventors: Edward M. Dowd, Madison, CT (US); John J. Grunbeck, Northford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 12/139,973

(22) Filed: Jun. 16, 2008

(65) Prior Publication Data

US 2008/0247718 A1 Oct. 9, 2008

Related U.S. Application Data

(63) Continuation-in-part of application No. 11/397,791, filed on Apr. 4, 2006, now Pat. No. 7,424,190, which is a continuation of application No. 10/422,396, filed on Apr. 24, 2003, now Pat. No. 7,024,081.

(51) Int. Cl.
G02B 6/44 (2006.01)
(52) U.S. Cl. ..................................... 385/109
(58) Field of Classification Search ................ 385/128, 385/113, 109
See application file for complete search history.

(56) References Cited

U.S. PATENT DOCUMENTS

| | | | |
|---|---|---|---|
| 4,183,621 A | 1/1980 | Kao et al. | |
| 4,435,238 A | 3/1984 | Smith | |
| 4,477,147 A | 10/1984 | Winter et al. | |
| 4,568,144 A | 2/1986 | Occhini et al. | |
| 4,579,420 A | 4/1986 | Winter et al. | |
| 4,718,747 A | 1/1988 | Bianchi et al. | |
| 4,725,122 A | 2/1988 | Anelli et al. | |
| 4,745,238 A | 5/1988 | Kotthaus et al. | |
| 4,756,596 A | 7/1988 | Ona et al. | |
| 4,798,443 A | 1/1989 | Knipe et al. | |
| 4,859,024 A | 8/1989 | Rahman | |
| 5,199,096 A | 3/1993 | Kathiresan et al. | |
| 5,455,881 A | 10/1995 | Bosisio et al. | |
| 5,570,449 A | 10/1996 | Hutchinson et al. | |
| 5,608,159 A * | 3/1997 | Carcone et al. | ............... 73/49.8 |
| 5,827,267 A * | 10/1998 | Savage et al. | .................. 606/16 |
| 5,862,284 A | 1/1999 | Paborn et al. | |

(Continued)

FOREIGN PATENT DOCUMENTS

DE 196 02 117 7/1997

(Continued)

OTHER PUBLICATIONS

British Search Report dated Jul. 23, 2009.

(Continued)

*Primary Examiner*—Frank G Font
*Assistant Examiner*—Eric Wong
(74) *Attorney, Agent, or Firm*—Patterson & Sheridan, LLP

(57) ABSTRACT

Purging interior regions of a cable reduces or prevents hydrogen darkening of an optical fiber located in the cable. While hydrogen may permeate through an outer surface of the cable, fluid circulating through the cable purges the hydrogen from within the cable. This circulation of the fluid occurs between an inner tube containing the fiber and an outer tube surrounding the inner tube.

20 Claims, 11 Drawing Sheets

U.S. PATENT DOCUMENTS

| | | |
|---|---|---|
| 5,917,978 A | 6/1999 | Rutterman |
| 6,404,961 B1 | 6/2002 | Bonja et al. |
| 6,519,388 B1 * | 2/2003 | Fernald et al. ............... 385/37 |
| 6,690,866 B2 | 2/2004 | Bonja et al. |
| 7,024,081 B2 | 4/2006 | Dowd et al. |
| 2005/0236161 A1 | 10/2005 | Gay et al. |
| 2006/0182398 A1 | 8/2006 | Dowd et al. |
| 2007/0122104 A1 | 5/2007 | Chalifoux et al. |
| 2008/0247718 A1 * | 10/2008 | Dowd et al. ............... 385/113 |
| 2008/0273852 A1 * | 11/2008 | Parker et al. ............... 385/128 |

FOREIGN PATENT DOCUMENTS

| | | |
|---|---|---|
| FR | 2 803 666 | 7/2001 |
| JP | 3144403 | 6/1991 |
| JP | 11174293 | 7/1999 |
| WO | 2008051945 A2 | 5/2008 |

OTHER PUBLICATIONS

Canadian Office Action, Application No. 2,465,179, dated Jun. 19, 2009.

* cited by examiner

FIBER OPTIC CABLE SYSTEMS AND METHODS TO PREVENT HYDROGEN INGRESS

CROSS-REFERENCE TO RELATED APPLICATION

This application is a continuation-in-part of U.S. patent application Ser. No. 11/397,791, filed Apr. 4, 2006 now U.S. Pat. No. 7,424,190, which is a continuation of U.S. patent application Ser. No. 10/422,396 filed Apr. 24, 2003, now U.S. Pat. No. 7,024,081. Each of the aforementioned related patent applications are herein incorporated by reference.

BACKGROUND OF THE INVENTION

1. Field of the Invention

Embodiments of the invention generally relate to fiber optic cable systems for use in harsh environments such as gas and oil wellbore applications.

2. Background of the Related Art

With advancements in the area of fiber optic sensors for use in harsh environments, there is an increasing need for fiber optic cables compatible with the harsh environmental conditions present in oil and gas wellbore applications. For example, fiber optic cables utilized in sensing applications within the wellbore must be able to operate reliably in conditions that may include temperatures in excess of 300 degrees Celsius, static pressures in excess of 138,000 kilopascal (kPa), vibration, corrosive chemistry and the presence of high partial pressures of hydrogen. The hydrogen tends to darken waveguides in the cable causing undesired attenuation.

FIG. 7 depicts one example of a conventional fiber optic cable 700 suitable for use in harsh environments such as oil and gas wellbore applications. The fiber optic cable 700, shown in FIG. 7, includes a fiber in metal tube (FIMT) core 702 surrounded by an outer protective sleeve 704. The FIMT core 702 includes an inner tube 706 surrounding one or more optical fibers 708. Three optical fibers 708 are shown disposed within the inner tube 706 in the embodiment of FIG. 7. A filler material 710 is disposed in the inner tube 706 to fill the void spaces not occupied by the optical fibers 708. The filler material 710 may also include a hydrogen absorbing/scavenging material to minimize the effects of hydrogen on the optical performance of the fiber 708. The outer protective sleeve 704 includes a buffer material 712 and an outer tube 714. The buffer material 712 provides a mechanical link between the inner tube 706 and the outer tube 714 to prevent the inner tube 706 from sliding within the outer tube 714. Additionally, the buffer material 712 keeps the inner tube 706 generally centered within the outer tube 714 and protects the inner tube 706 and coatings formed thereon from damage due to vibrating against the outer tube 714.

At least one of the inner or outer surfaces of the inner tube 706 is coated or plated with a low hydrogen permeability material 716 to minimize hydrogen diffusion into an area around the optical fibers 708. As temperature increases, materials (e.g., the low hydrogen permeability material 716) of prior cables disposed around optical waveguides to provide hydrogen blocking become less effective since hydrogen diffuses faster through these materials. This susceptibility of the optical waveguides to attack by hydrogen in high temperature environments reduces service life of the cables.

Therefore, there exists a need for improved fiber optic cables and methods for use in harsh environments.

SUMMARY OF THE INVENTION

In one embodiment, a method of deploying an optic cable includes providing the cable, which includes an inner tube having an optical fiber disposed inside the inner tube and an outer tube with an inner diameter sized for relative retention of the inner tube disposed inside the outer tube. In addition, the method includes positioning the cable at a location. Controlled flowing of a fluid between the inner and outer tubes removes hydrogen from within the cable positioned at the location.

For one embodiment, an optic cable system includes a cable and a source of fluid. The cable includes an inner tube having an optical fiber disposed inside the inner tube and an outer tube with an inner diameter sized for relative retention of the inner tube disposed inside the outer tube. A flow path disposed between the inner and outer tubes extends across a length of the cable and includes an inlet and an outlet. The source of fluid couples to the inlet of the flow path with the fluid being pressurized to achieve controlled fluid flow of the fluid through the flow path from the inlet toward the outlet that is defined.

According to one embodiment, a method of deploying an optic cable includes providing the cable, which includes an inner tube having an optical fiber disposed inside the inner tube and an outer tube with an inner diameter sized for relative retention of the inner tube disposed inside the outer tube. The method additionally includes lowering the cable into a wellbore. Removing hydrogen from within the cable while located in the wellbore occurs by circulating a fluid between the inner and outer tubes.

BRIEF DESCRIPTION OF THE DRAWINGS

A more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

Embodiments of the invention relate to reducing or preventing hydrogen darkening of an optical fiber located in a cable. While hydrogen may permeate through an outer surface of the cable, fluid circulating through the cable purges the hydrogen from within the cable. This circulation of the fluid occurs between an inner tube containing the fiber and an outer tube surrounding the inner tube.

Figure 1:
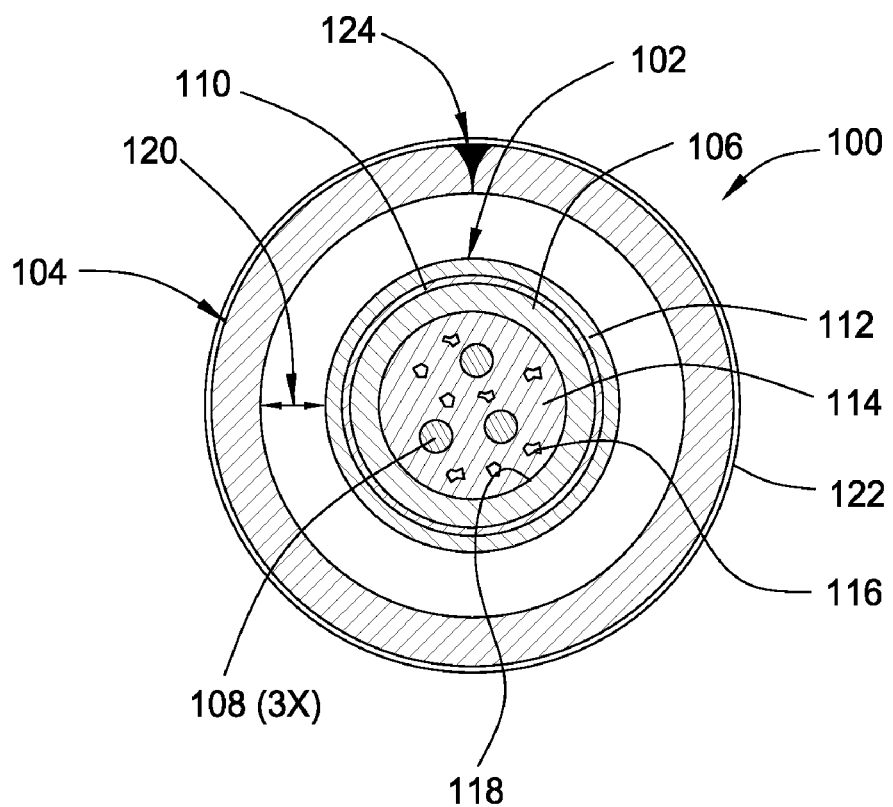
FIG. 1 is a cross sectional view of one embodiment of a fiber optic cable suitable for use in oil and gas wellbore applications.

FIG. 1 shows one embodiment of a fiber optic cable 100 suitable for use in oil and gas wellbore applications. The cable 100 comprises a fiber in metal tube (FIMT) core 102 disposed in a protective outer tube 104. The FIMT 102 comprises an inner tube 106 surrounding one or more optical fibers 108, three of which are shown in the embodiment depicted in FIG. 1.

The inner tube 106 is fabricated from a corrosion resistant material. Examples of suitable corrosion resistant metal alloys include, but are not limited to, 304 stainless steel, 316 stainless steel, INCONEL® 625 and INCOLOY® 825, among others. Examples of suitable plastics include, but are not limited to fluoropolymers, ethylene-chlorotrifluoroethylene, fluoroethylenepropylene, polyvinylidene fluoride, polyvinylchoride, HALAR®, TEFLON® and TEFZEL®, among others. The diameter of the inner tube 106 may be in the range of about 1.1 to about 2.6 millimeters (mm), and in an exemplary embodiment of the invention is about 2.4 mm. Although the inner tube 106 is described as being about 1.1 to about 2.6 mm in diameter, the diameter of the inner tube 106 may vary, depending upon the materials used and the number of optical fibers 108 to be placed in the inner tube 106.

In one embodiment, the inner tube 106 has a wall thickness suitable for a seam welding process utilized to fabricate the tube from a coil of metal strip. For example, the wall thickness of the 304 stainless steel inner tube 106 may be about 0.2 mm to facilitate a continuous laser weld during a tube forming process. In another embodiment, the inner tube 106 has a wall thickness suitable for fabrication by plastic extrusion.

An optional plated barrier coating 110 may be disposed on at least one of the inner or outer surfaces of the inner tube wall. The barrier coating 110 may be coated, plated or otherwise adhered to the inner tube 106 and may be comprised of a low hydrogen permeability material, such as tin, gold, carbon, or other suitable material. The thickness of the barrier coating 110 is selected to slow the diffusion of hydrogen into the center of the inner tube 106 driven by a high partial pressure hydrogen environment present in some wells. Depending upon the barrier coating material, the coating thickness may be in the range of about 0.1 to about 30 microns or thicker. For example, a carbon barrier coating 110 may have a thickness of about 0.1 microns, while a tin barrier coating 110 may have a thickness of approximately 13 microns. In one embodiment, the barrier coating 110 includes a nickel seed layer disposed on the tube surface that provides an adhesion layer for an outer layer of low hydrogen permeability material. In applications where high partial pressures of hydrogen are not expected, the barrier coating 110 may be omitted.

In one embodiment, a protective outer coating 112 is disposed over the barrier coating 110. The outer coating 112 is a protective layer of hard, scratch resistant material, such as nickel or a polymer such as polyamide, among others, that substantially prevents the barrier coating 110 from damage from contact with the outer tube 104. The outer coating 112 may have a thickness in the range of about 0.5 to about 15 microns, depending on the selected material.

A filler material 114 is disposed in the inner tube 106 and substantially fills the void spaces within the inner tube 106 surrounding the optical fibers 108 to support and prevent the optical fibers 108 from moving excessively within the inner tube 106. The filler material 114 has sufficient viscosity to resist the shear forces applied to it as a result of the weight of the optical fiber 108 when disposed in a vertical well installation at elevated temperatures, thereby supporting the optical fibers 108 without subjecting the fibers to the strain of their weight. The filler material 114 has an operating temperature range of about 10 to about 200 degrees Celsius. However, the cable 100 may be utilized over a wider temperature range.

The filler material 114 is also configured to allow the optical fibers 108 to relax and straighten with respect to the inner tube 106 due to differences in the coefficients of thermal expansion between the optical fiber 108 and the inner tube 106 and during spooling, deployment and use of the cable 100. The filler material 114 also prevents chaffing of the coatings on the optical fibers 108 as a result of bending action during installation and vibration of the cable 100. The filler material 114 also serves as a cushion for the optical fiber 108 against the surface of the inner tube 106 to avoid microbend losses across cable bends. Suitable compounds for the filler material 114 include conventional thixotropic gels or grease compounds commonly used in the fiber optic cable industry for water blocking, filling and lubrication of optical fiber cables. Optionally, the filler material 114 may be omitted.

To further reduce the effects of hydrogen on the optical fibers 108, the filler material 114 may optionally include or be impregnated with a hydrogen absorbing/scavenging material 116, such as palladium or tantalum, and the like. In one embodiment, the hydrogen absorbing/scavenging material 116 is a vanadium-titanium wire coated with palladium. Alternatively, the inner tube 106 may be coated with a hydrogen absorbing/scavenging material below the barrier coating 110 or on the interior surface 118 of the inner tube 106, or such a hydrogen absorbing/scavenging material may be impregnated into the tube material, or any combination of the above.

The optical fibers 108 are selected to provide reliable transmission of optical signals through the cable 100 disposed in a gas or oil wellbore application. Suitable optical fibers 108 include low defect, pure silica core/depressed clad fiber. Alternatively, suitable optical fibers 108 include germanium doped single mode fiber or other optical fiber suitable for use in a high temperature environment. The optical fibers 108 disposed within the inner tube 106 may be comprised of the same type or of different types of materials. Although the invention is described herein as using three optical fibers 108 within the inner tube 106, it contemplated that one or more fibers 108 may be used. The total number of fibers 108 and the diameter of the inner tube 106 are selected to provide sufficient space to prevent microbending of the optical fibers 106 during handing and deployment of the cable 100.

As the fiber optic cable 100 has an operating temperature ranging at least between about 10 to about 200 degrees Celsius, a greater length of optical fibers 108 are disposed per unit length of inner tube 106 to account for the different coefficient of thermal expansion (CTE) represented by the optical fibers 108 and the inner tube 106. The inner tube diameter is configured to accept an excess length of "serpentine over-stuff" of optical fiber 108 within the inner tube 106. In one embodiment, the excess length of optical fiber 108 may be achieved by inserting the fiber 108 while the inner tube 106 is at an elevated temperature, for example, during laser welding of the inner tube 106. The temperature of the inner tube 106 is controlled such that it approximates the anticipated maximum of normal operating temperature of the final installation. This process will lead to an excess length of fiber 108 of up to 2.0 percent or more within the inner tube 106 cooling of the inner tube.

The FIMT core 102 is surrounded by the outer tube 104 that is configured to provide a gap 120 therebetween. The gap 120 is filled with air or other non-structural material and provides sufficient isolation between the outer tube 104 and FIMT core 102 to prevent the various layers of the FIMT core 102 from excessively contacting the outer tube 104 and becoming damaged. As the FIMT core 102 and outer tube 104 are not retained in continuous contact with one another, the serpentine orientation of the FIMT core 102 within the outer tube 104 (shown in FIG. 2) results in intermittent contact points 202 therebetween. The intermittent contact points 202 retain the inner tube 106 relative to the outer tube 104, thus creating enough friction to prevent the inner tube 106 from moving within the outer tube 104 and damaging the coatings applied to the exterior of the inner tube 106.

Returning to FIG. 1, the outer tube 104 is manufactured of a corrosion resistant material that easily diffuses hydrogen. The outer tube 104 may be manufactured of the same material of the inner tube 106 and may be fabricated with or without a coating of a low hydrogen permeability coating or hydrogen scavenging material. Examples of outer tube materials include suitable corrosion resistant metal alloys such as, but not limited to, 304 stainless steel, 316 stainless steel, INCONEL® 625 and INCOLOY® 825, among others.

In one embodiment, the outer tube 104 is seam welded over the FIMT core 106. The weld seam 124 of the outer tube 104 may be fabricated using a TIG welding process, a laser welding process, or any other suitable process for joining the outer tube 104 over the FIMT core 102.

After welding, the outer tube 104 is drawn down over the FIMT core 102 to minimize the gap 120. The gap 120 ensures that the outer tube 104 is not mechanically fixed to the FIMT core 102, thereby preventing thermally induced motion or strain during use at elevated temperatures and/or over temperature cycling, which may damage the barrier and/or outer coatings 110, 112 if the outer tube 104 were to slide over the inner tube 106.

Alternatively, the outer tube 104 may be rolled or drawn down against the FIMT core 102, where care is taken not to extrude or stretch the FIMT core 102 such that the excess length of the fibers 108 within the FIMT core 102 is not appreciably shortened. In embodiments where the outer tube 104 and the FIMT core 102 are in substantially continuous contact, the inner and outer tubes 106, 104 may be fabricated from the same material to minimize differences in thermal expansion, thereby protecting the coating applied to the exterior of the inner tube 106.

An initial diameter of the outer tube 104 should be selected with sufficient space as not to damage the FIMT core 102 during welding. The outer tube 104 may be drawn down to a final diameter after welding. In one embodiment, the outer tube 104 has a final diameter of less than about 4.7 mm to less than about 6.3 mm and has a wall thickness in the range of about 0.7 to about 1.2 mm. Other outer tube diameters are contemplated and may be selected to provide intermittent mechanical contact between the inner tube 106 and the outer tube 104 to prevent relative movement therebetween.

To further protect the cable 100 during handling and installation, a protective jacket 122 of a high strength, protective material may be applied over the outer tube 104. For example, a jacket 122 of ethylene-chlorotrifluoroethylene (ECTFE) may be applied over the outer tube 104 to aid in the handling and deployment of the cable 100. In one embodiment, the jacket 122 may have a non-circular cross-section, for example, ellipsoid or irregular, or polygonal, such as rectangular. The protective jacket 122 may be comprised of other materials, such as fluoroethylenepropylene (FEP), polyvinylidene fluoride (PVDF), polyvinylchloride (PVC), HALAR®, TEFLON®, fluoropolymer, or other suitable material.

As the diameter of the outer tube 104 and optional protective jacket 122 result in a cable 100 that is much smaller than conventional designs, more cable 100 may be stored on a spool for transport. For example, a cable 100 having a diameter of about 3.2 mm may have a length of about 24 kilometers stored on a single spool, thereby allowing multiple sensing systems to be fabricated from a single length of cable without splicing. Furthermore, the reduced diameter of the cable 100 allows for more room within the wellhead and wellbore, thereby allowing more cables (or other equipment) to be disposed within the well. Moreover, as the cable 100 is lighter and has a tighter bending radius than conventional designs, the cable 100 is easier to handle and less expensive to ship, while additionally easier to deploy efficiently down the well. For example, conventional quarter 6.3 mm cables typically have a bending radius of about 101 mm, while an embodiment of the cable 100 having a 3.1 mm diameter has a bending radius of less than 76.2 mm, and in another embodiment, to about 50.8 mm.

Figure 3A:
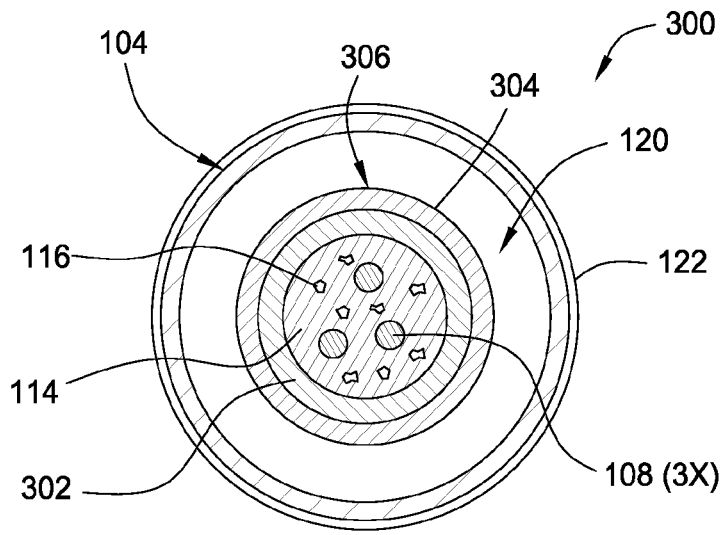
FIGS. 3A-E are cross sectional views of alternative embodiments of a fiber optic cable suitable for use in oil and gas wellbore applications.

FIG. 3A illustrates a cross sectional view of another embodiment of a fiber optic cable 300 suitable for use in oil and gas wellbore applications. The cable 300 is substantially similar in construction to the cable 100 described above, having an FIMT core 306 disposed within a protective outer tube 104.

The FIMT 306 comprises an inner metal tube 302 having a polymer shell 304 surrounding one or more optical fibers 108. The inner tube 302 is fabricated similar to the metal embodiment of the inner tube 302 described above, while the polymer shell 304 may be applied to the exterior of the inner tube 302 by extruding, spraying, dipping or other coating method. The polymer shell 304 may be fabricated from, but is not limited to fluoropolymers, ethylene-chlorotrifluoroethylene, fluoroethylenepropylene, polyvinylidene fluoride, polyvinylchoride, HALAR®, TEFLON® and TEFZEL®, among others. Although the polymer shell 304 is illustrated as a circular ring disposed concentrically over the inner tube 302, it is contemplated that the polymer shell 304 may take other geometric forms, such as polygonal, ellipsoid or irregular shapes.

An optional plated barrier coating (not shown) similar to the coating 110 described above, may be disposed on at least one of the inner or outer surfaces of at least one of the inner tube 302 or polymer shell 304. In one embodiment, a protective outer coating (also not shown) similar to the outer coating 112 described above, is disposed over the barrier coating 110. The outer coating 112 is a protective layer of hard, scratch resistant material, such as nickel or a polymer such as polyamide, among others, that substantially prevents the barrier coating 110 from damage from contact with the outer tube 104.

The optical fibers 108 are selected to provide reliable transmission of optical signals through the cable 300 disposed in a gas or oil wellbore application. Although the invention is described herein as using three optical fibers 108 within the inner tube 302, it is contemplated that one or more fibers 108 may be used. The optical fibers 108 may be disposed in filler material 114 that substantially fills the void spaces within the inner tube 302 surrounding the optical fibers 108. The filler material 114 may optionally be impregnated with a hydrogen absorbing/scavenging material 116, such as palladium or tantalum, and the like.

The outer tube 104 is configured to intermittently contact the FIMT core 306 while substantially maintain a gap 120 as described above. The intermittent contact between the outer tube 104 and FIMT core 306 prevents the FIMT core 306 from moving within the outer tube 104 while advantageously minimizing the outer diameter of the cable 300 as compared to conventional designs.

Figure 3D:
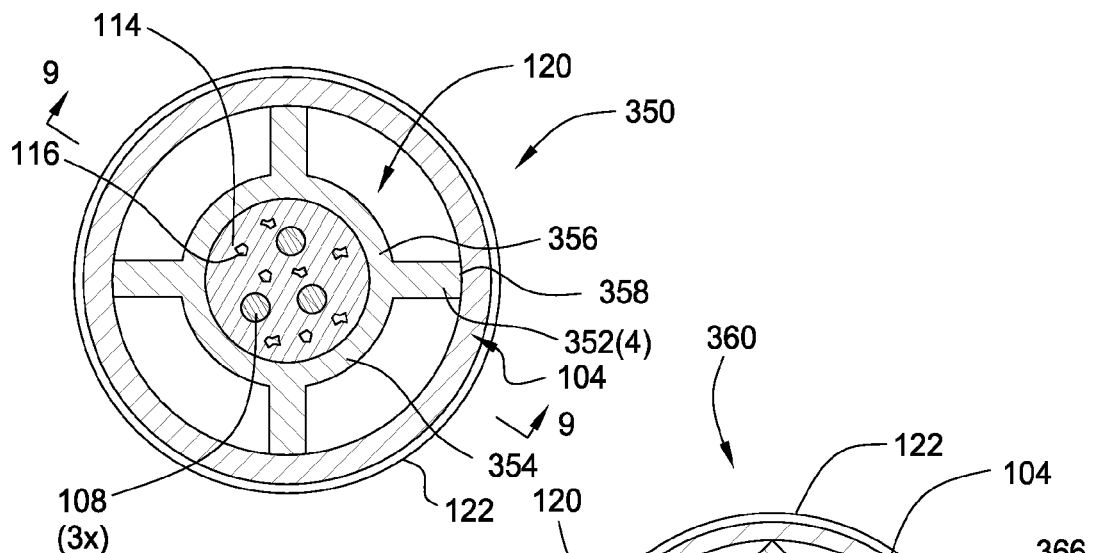
Figure 3E:
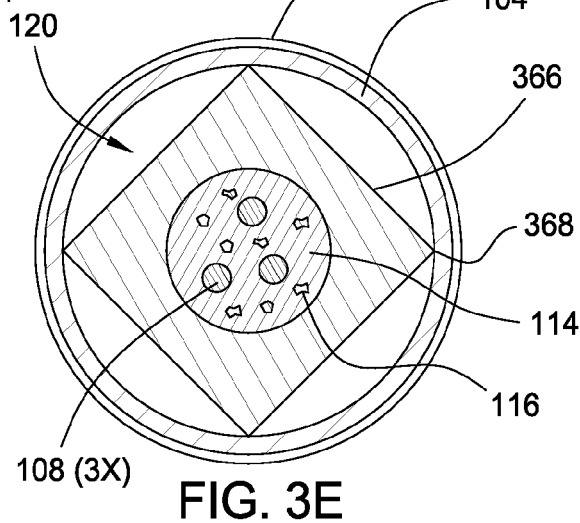
Figure 3C:
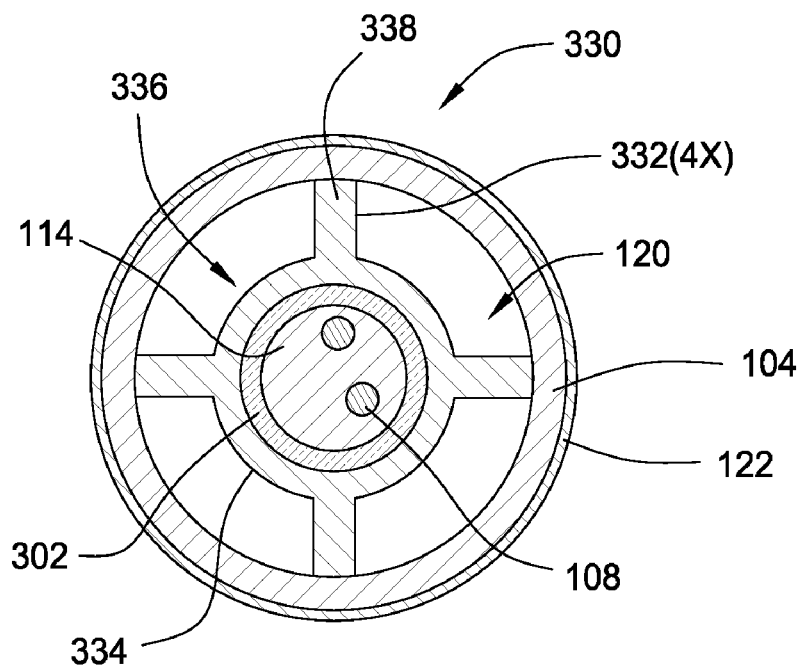
Figure 3B:
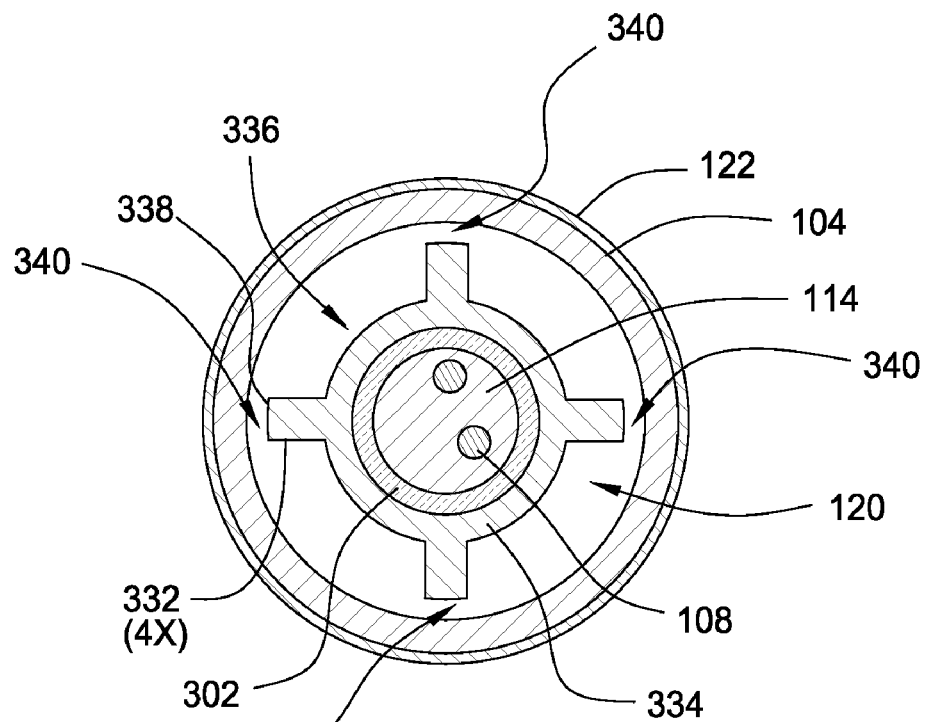

FIG. 3B depicts a cross sectional view of another embodiment of a fiber optic cable suitable for use in oil and gas wellbore applications. The cable is substantially similar in construction to the cable 300 described above, having an FIMT core 336 disposed within a protective outer tube 104, except that the FIMT core 336 includes a plurality of fins 332.

Figure 2:
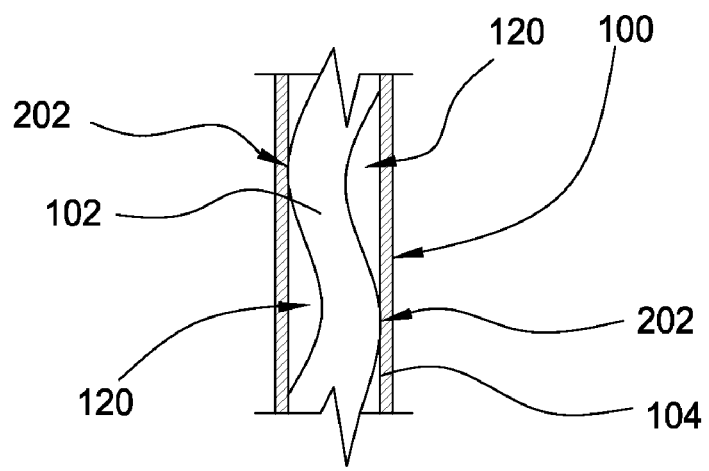
FIG. 2 is a partial sectional side view of the optic cable of FIG. 1.

In one embodiment, the FIMT core 336 includes an inner metal tube 302 having a polymer shell 334 disposed thereover. The fins 332 extend outwardly from the polymer shell 334. The fins 332 are typically unitarily formed with the shell 334 during an extrusion process, but may alternatively be coupled to the shell 334 through other fabrication processes. Ends 338 of the fins 332 generally extend from the shell 334 a distance configured to allow a gap 340 to be defined between the ends 338 and the wall of the outer tube 104. The gap 340 allows the FIMT core 336 to be disposed within the outer tube 104 in a serpentine orientation (similar to as depicted in FIG. 2), thereby allowing intermittent contact between the FIMT core 336 and the outer tube 104 that substantially secures the core 336 and outer tube 104 relative to one another.

In an alternative fiber optic cable 330, as depicted in FIG. 3C, the outer tube 104 may be sized or drawn down to contact the fins 332 of the FIMT core 336, thus mechanically coupling the FIMT core 336 to the outer tube 104. In this embodiment, a gap 120 remains defined between the shell 334 and outer tube 104 to substantially protect the FIMT core 336 and any coatings disposed thereon, while the mechanical engagement of the outer tube 104 and fins 332 prevent movement of the core 336 within the outer tube 104. Moreover, the space defined between the fins 332 provides spacing between the FIMT core 336 and the outer tube 104 to prevent damage of the FIMT core 336 during welding. Additionally, the fins 332 may be slightly compressed during the reduction in diameter of the outer tube 104 so that the FIMT core 336 is not stretched or extruded in a manner that substantially removes the excess length of fiber within the FIMT core 336.

FIG. 3D depicts a cross sectional view of another embodiment of a fiber optic cable 350 suitable for use in oil and gas wellbore applications. The cable 350 is substantially similar in construction to the cable 330 described above, having a fiber in tube (FIT) core 356 disposed within a protective outer tube 104, except that the FIT core 356 includes a plurality of fins 352 extending from a polymer inner tube 354 that surrounds at least one optical fiber 108 without an intervening metal tube.

The fins 352 are unitarily formed with the polymer inner tube 354 during an extrusion process, but may alternatively be coupled to the inner tube 354 through other fabrication processes. During fabrication, the optical fiber 108 is disposed in the polymer inner tube 354 while the tube 354 is in an expanded state, for example, immediately after the polymer inner tube 354 is extruded or after heating the tube. As the polymer tube 354 cools and shrinks, the length of optical fiber 108 per unit length of polymer tube 354 increases, thereby allowing enough optical fiber 108 to be disposed within the polymer tube 354 to ensure minimal stress upon the optical fiber 108 after the polymer tube 354 has expanded when subjected to the hot environments within the well.

Ends 358 of the fins 352 generally extend from the polymer inner tube 354 a distance configured to allow a gap to be defined between the ends 358 and the wall of the outer tube 104 or to contact the outer wall 104 as shown. In either embodiment, a gap 120 remains defined between the polymer inner tube 354 and outer tube 104 to substantially protect the FIT core 356 and any coatings disposed thereon.

FIG. 3E depicts a cross sectional view of another embodiment of a fiber optic cable 360 suitable for use in oil and gas wellbore applications. The cable 360 is substantially similar in construction to the cable 350 described above, having a FIT core 366 disposed within a protective outer tube 104, except that the FIT core 366 defines a polymer without fins and without an intervening metal tube.

The FIT core 366 has a polygonal form, such as a triangle or polygon (a square is shown in the embodiment depicted in FIG. 3E). However, it is contemplated that the FIT core 366 may take other geometric forms, such as polygonal, ellipsoid, circular or irregular shapes, where the FIT core 366 has a different geometric shape than the inner diameter of the outer tube 104.

In the embodiment depicted in FIG. 3E, the FIT core 366 includes corners 368 that generally extend from the FIT core 366 a distance configured to allow a gap to be defined between the corners 368 and the wall of the outer tube 104 or to contact the outer wall 104 as shown. In either embodiment, a gap 120 remains defined between the FIT core 366 and outer tube 104 to substantially protect the FIT core 366 and any coatings disposed thereon.

Figure 4:
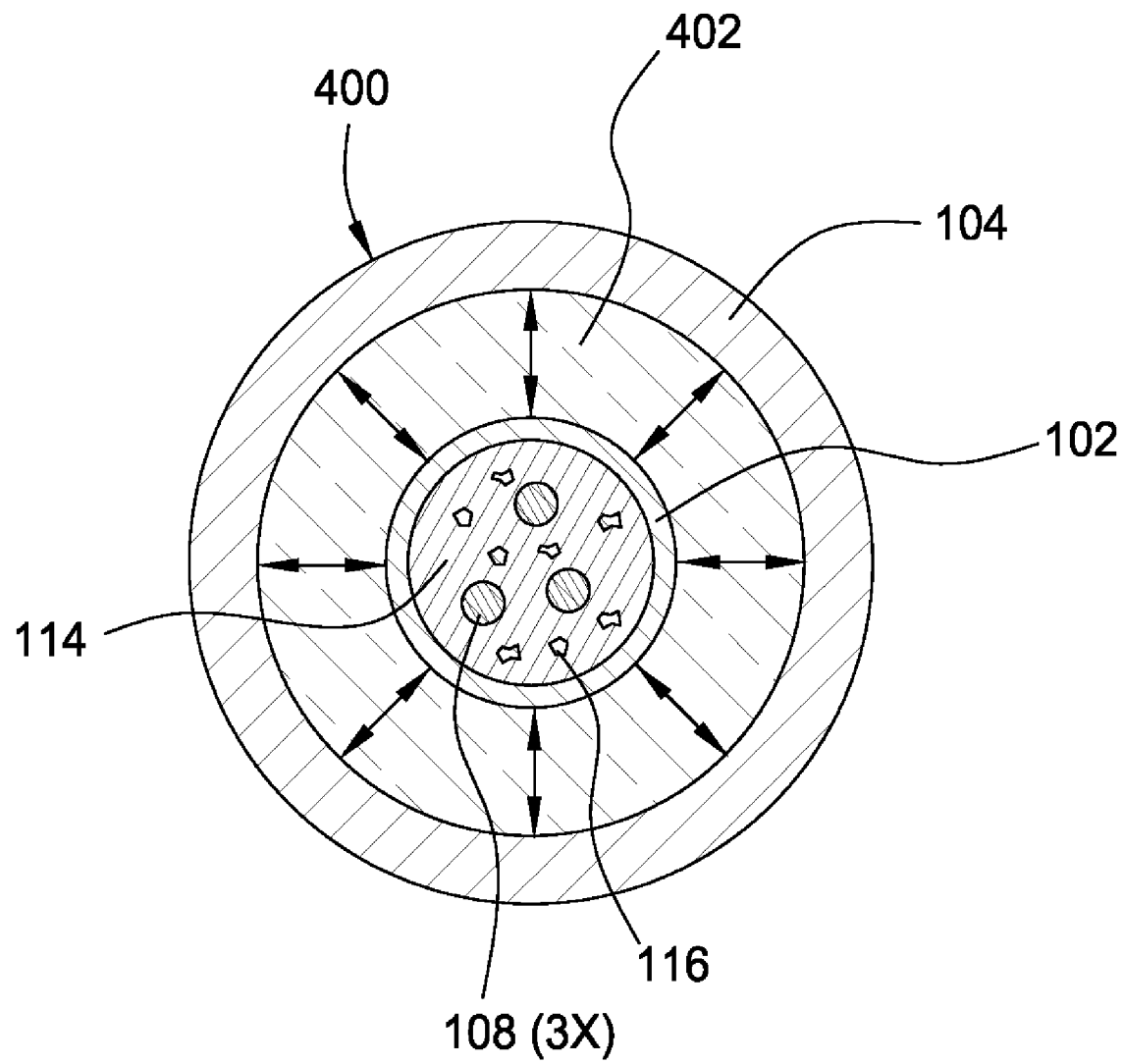
FIG. 4 is a cross sectional view of another embodiment of a fiber optic cable suitable for use in oil and gas wellbore applications.

FIG. 4 depicts another embodiment of a cross sectional view of another embodiment of a fiber optic cable 400 suitable for use in oil and gas wellbore applications. The cable 400 is substantially similar in construction to the cables described above, except that the cable 400 includes an expanded polymer spacer 402 that applies a force against an outer tube 104 and an FIMT core 102 that bound the spacer 402.

The polymer spacer 402 may be a foamed polymer, such as urethane or polypropylene. In one embodiment, the polymer spacer 402 may be injected and foamed between the outer tube 104 and the FIMT core 102 after the outer tube 104 has been welded. In another embodiment, the polymer spacer 402 may be disposed over the FIMT core 102 and compressed during a diameter reducing step applied to the outer tube 104 after the welding. In yet another embodiment, the polymer spacer 402 may be applied to the exterior of the FIMT core 102, and activated to expand between the outer tube 104 and the FIMT core 102 after welding. For example, the polymer spacer 402 may be heated by passing the cable 400 through an induction coil, where the heat generated by the induction coil causes the polymer spacer 402 to expand and fill the interstitial space between the outer tube 104 and the FIMT core 102. As the polymer spacer 402 is biased against both the outer tube 104 and the FIMT core 102, any well fluids that may breach the outer tube 104 are prevented from traveling along the length of the cable 400 between the outer tube 104 and the FIMT core 102.

Figure 5:
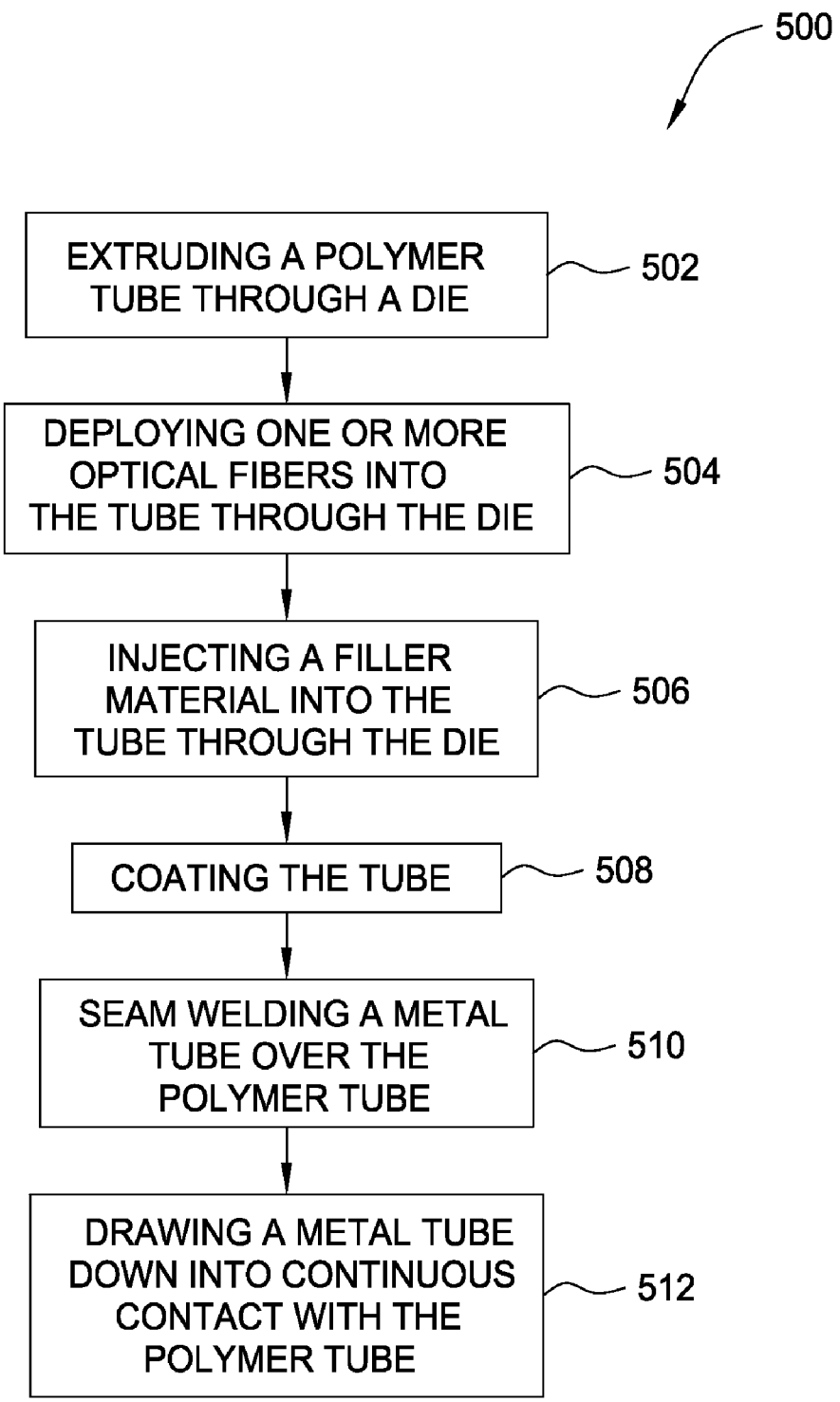
FIG. 5 flow diagram of one embodiment of a method for fabricating a fiber optic cable suitable for use in oil and gas wellbore applications.
Figure 6:
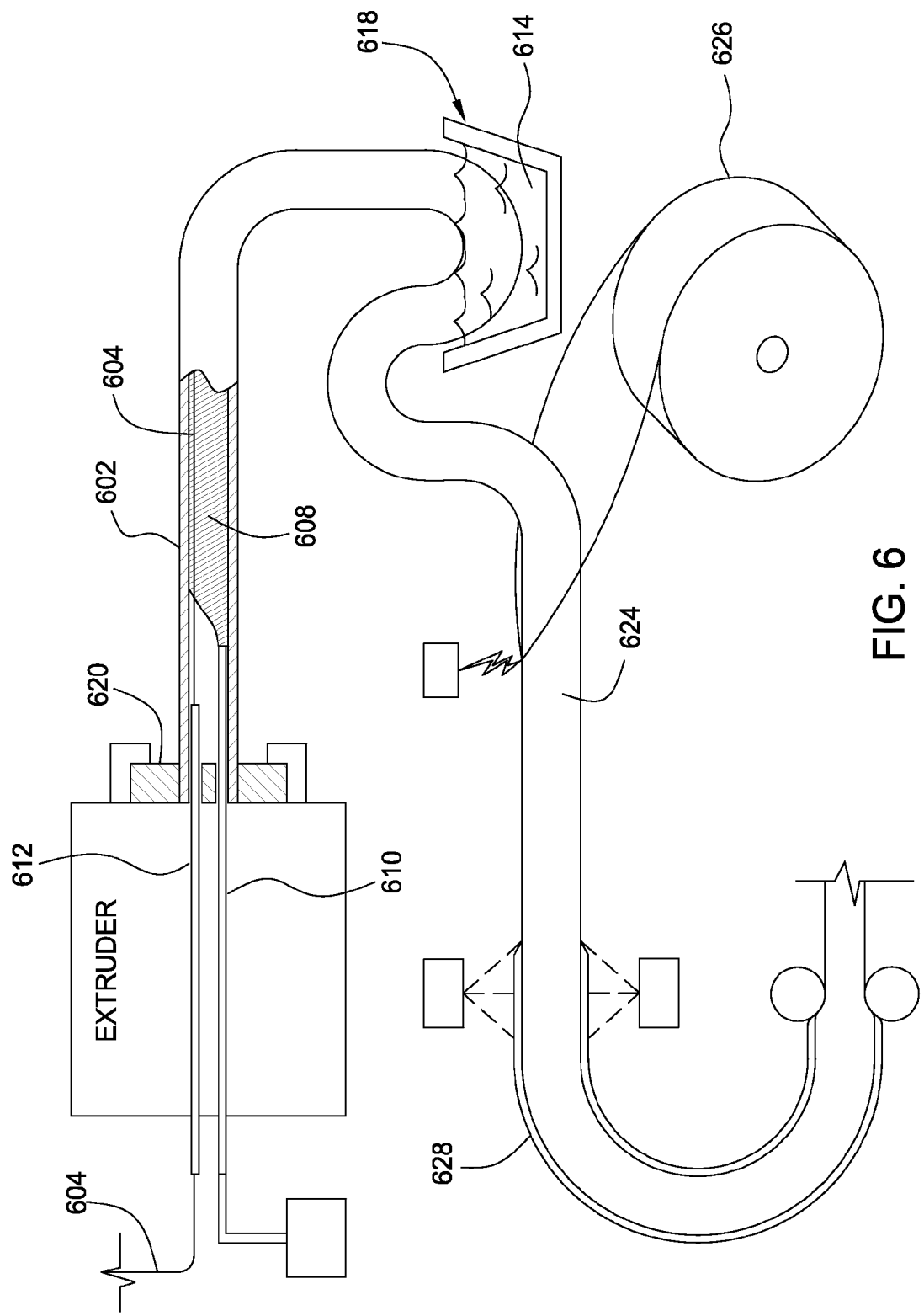
FIG. 6 is a simplified schematic of one embodiment of a fiber optic cable assembly line.
Figure 7:
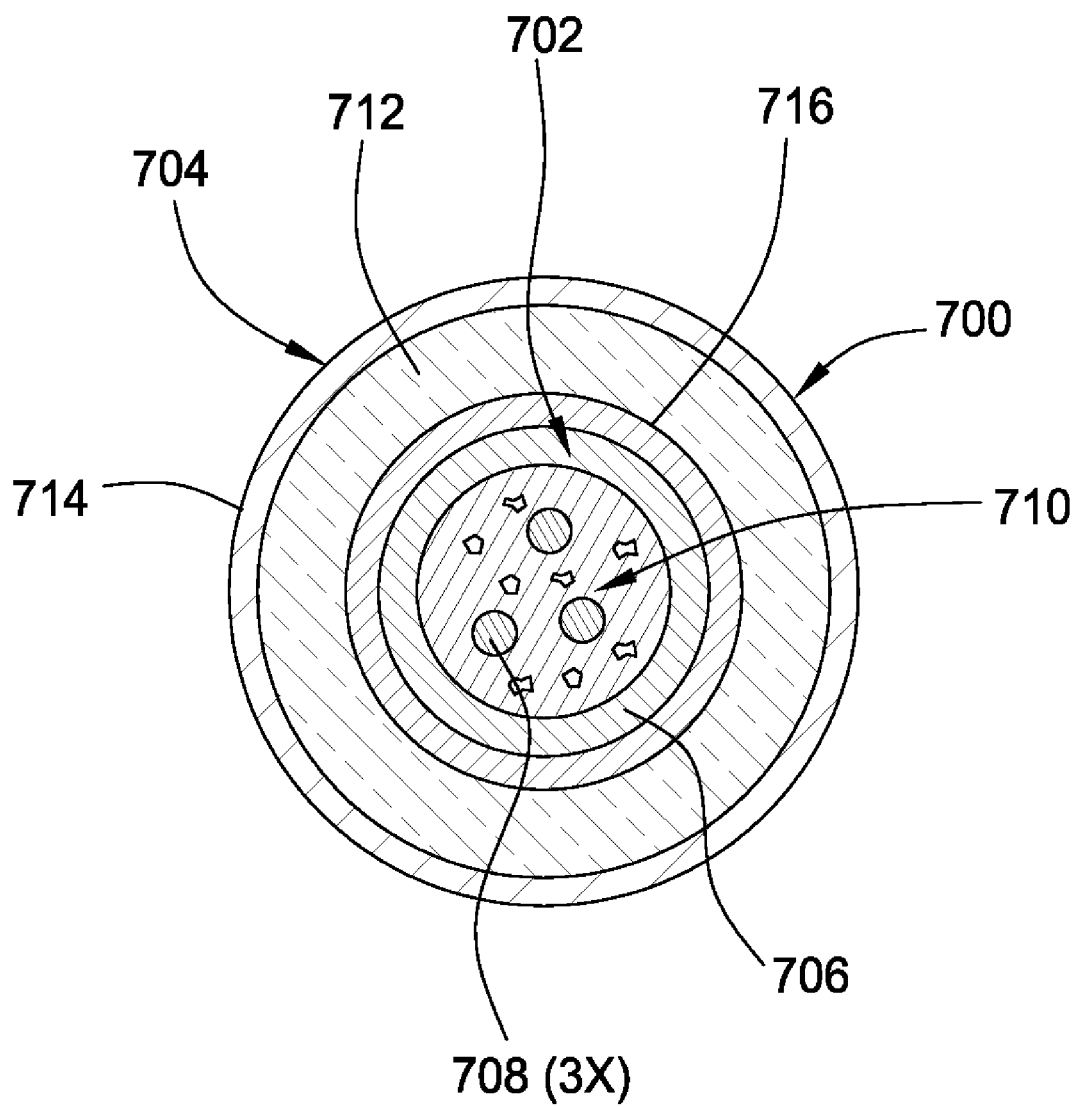
FIG. 7 depicts one example of a conventional fiber optic cable suitable for use in oil and gas wellbore applications.

FIGS. 5-6 are a flow diagram and simplified schematic of one embodiment of a method 500 for fabricating the optic cable 330. The reader is encouraged to refer to FIGS. 5 and 6 simultaneously.

The method 500 begins at step 502 by extruding a polymer tube 602 through a die 620 around at least one or more optical fibers 604. The optical fibers 604 may optionally be sheathed in a seam welded metal tube as described with reference to FIG. 1, and as described in U.S. Pat. No. 6,404,961, incorporated by reference. As the polymer tube 602 is formed, the one or more optical fibers 604 are deployed from a first conduit or needle 612 extending through the die 620 into the tube 602 to a point downstream from the extruder 606 where the polymer comprising the tube 602 has sufficiently cooled to prevent sticking of the fibers 604 to the tube wall at step 504. The one or more optical fibers 604 are disposed in the tube 602 at a rate slightly greater than the rate of tube formation to ensure a greater length of optical fiber 604 per unit length of polymer tube 602.

At an optional step 506, a filler material 608 may be injected into the interior of the polymer tube 602 to fill the void spaces surrounding the optical fibers 604. The filler material 608 is injected from a second conduit or needle 610 extending through the die 620 of the polymer tube 602 to a suitable distance beyond the extruder to minimize any reaction between the cooling polymer tube 602 and the filler material 608. The filler material 608 may optionally be intermixed with a hydrogen absorbing/scavenging material.

At an optional step 508, the polymer tube 602 may be coated with a barrier material 614. The barrier material may be applied by plating, passing the tube 602 through a bath, spraying and the like. In one embodiment, the barrier material 614 is plated on the polymer tube 602 by passing the tube through one or more plating baths 618.

At an optional step 510, a protective outer sleeve 624 is formed around the polymer tube 602. The outer sleeve 624 may include seam welding a metal strip 626 to form the sleeve 624 around the polymer tube 602. The protective outer sleeve 624 may also include a polymer jacket 628 applied over the sleeve 624. The polymer jacket 628 may be formed by spraying or immersing the sleeve 624 in a polymer bath after welding. If a protective outer sleeve 624 is disposed over the polymer tube 602, the metal sleeve 624 may be drawn down into continuous contact with the polymer tube 602 at step 512.

Thus, a fiber optic cable suitable for use in harsh environments such as oil and gas wellbore applications has been provided. The novel optic cable has unique construction that advantageously minimizes fabrication costs. Moreover, as the novel optic cable has a reduced diameter that allows greater spooled lengths of cable facilitates more efficient utilization as compared to conventional cable designs, thereby minimizing the cost of optical sensing systems that utilize optic cables in oil field applications.

Figure 8:
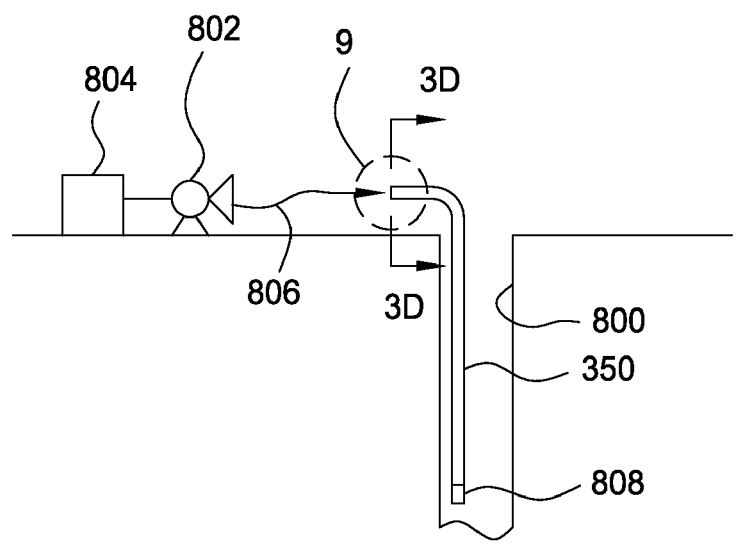
FIG. 8 is a cross sectional diagrammatic view a wellbore with the fiber optic cable shown in FIG. 3D disposed in the wellbore and coupled to a pump for circulating fluid within the cable around an inner tube surrounding optical fibers of the cable.

FIG. 8 shows a cross sectional diagrammatic view of a wellbore 800 with the fiber optic cable 350 shown in FIG. 3D disposed in the wellbore 800. The cable 350 couples to a flow control device, such as a pump 802 and/or valve, for circulating fluid within the cable 350. The pump 802 receives the fluid from a source 804 for inputting the fluid into the cable 350 as depicted by an arrow indicating flow 806. For some embodiments, the fluid in the source 804 may be pressurized such that no additional pumping of the fluid is required. The source 804 holds or otherwise provides the fluid, which may be a liquid or gas selected such that circulation of the fluid through the cable 350 flushes away hydrogen that may be diffusing into the cable 350.

A termination 808 of the cable 350 includes either a crossover area for flowing the fluid back through other flow paths of the cable 350 as described further herein or a vent, which may include a one-way valve assembly to let the fluid escape into the wellbore 800 without permitting ingress into the cable 350. Returning the fluid back to surface for discharge avoids potential complications of introducing the fluid in the wellbore, such as subsequent separation and removal of the fluid from other wellbore fluids or possible fluid locks created by the termination 808 being in a trapped volume, and facilitates ensuring no breach of the cable 350 in the wellbore 800 as may occur with problems from venting in the wellbore 800. One way flow of the fluid through the cable 350 thus may offer a more desirable approach in other applications where the cable 350 is not deployed in the wellbore 800.

Figure 9:
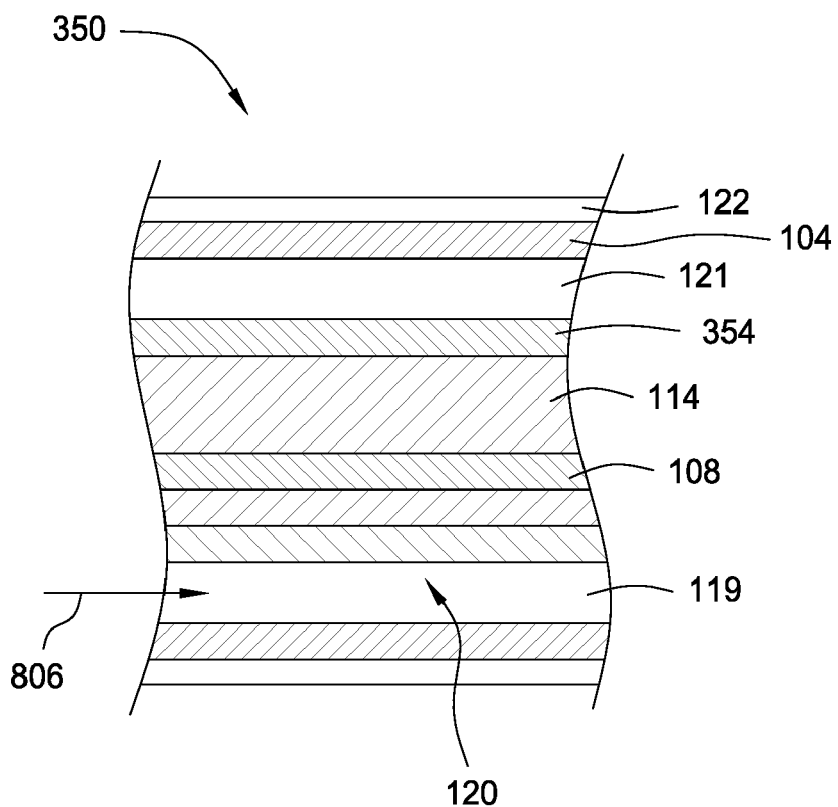
FIG. 9 is an enlarged sectional view taken at 9 in FIG. 8.

FIG. 9 illustrates an enlarged sectional view taken at 9 in FIG. 8. The flow 806 of the fluid traverses along a length of the cable 350 through a first path 119 defined by one of the gaps 120 between the inner and outer tubes 354, 104 of the cable 350. The first path 119 retains the flow 806 of the fluid in at least part of an annular area around the inner tube 354 surrounding the optical fibers 108 of the cable 350. Referring to FIG. 3D, the fins 352 may isolate the first path 119 formed by one of the gaps 120 from one or more other circumferential spaced ones of the gaps 120. Another one of the gaps 120, for example, may form a second path 121 separate from the first path 119. In operation, the fluid may flow through the second path 121 in an opposite direction from the flow 806 of the fluid in the first path 119 to enable return of the fluid upon reaching the termination 808 (shown in FIG. 8). As with other embodiments described herein, the termination 808 may include apertures, such as through the fins 352, or spacing between components at ends where, for example, at least the fins 352 terminate prior to reaching an enclosing end face of the cable 350. Such exemplary arrangements at the termination 808 enable flow to cross-over from the first path 119 to the second path 120. The flow 806 of the fluid may occur through any or all of the gaps 120. For some embodiments such as those where venting occurs at the termination 808, the flow 806 of the fluid passes in one direction around the inner tube 354 making isolation between the first and second paths 119, 121 not required as shown by example in FIG. 3B.

Regardless of configuration, the fluid may circulate through the cable 350 between first and second terminal ends of the cable 350. The circulation occurs for a period of time as required for removal of hydrogen during life of the cable 350, such as longer than one of a day, a week and a month. To provide the flow 806 across a desired length of the cable 350, the fluid enters and exits the cable 350 via an inlet and outlet at selected locations, such as proximate one of the ends of the cable 350 or respectively at each end of the cable 350 if no return of the fluid is desired. The inlet and outlet being defined makes controlled fluid flow through the first and second paths 119, 121 possible.

Operations to remove hydrogen utilize controlled circulation of the fluid through the cable 350. For some embodiments, sizing of the first and second paths 119, 121, pressure of the fluid in the source 804, and/or operation of the flow control device such as the pump 802 or a valve at where the flow 806 exits the cable 350 controls the flow 806 of the fluid into the cable 350. For some embodiments, flow rate of the fluid through the cable 350 may provide an exchange rate of all the fluid within the cable 350 of about once per day. This exchange rate may correspond to the flow rate being between 0.05 cubic meters and 1.5 cubic meters per day, as the cable 350 may contain less than about 0.03 cubic meters of fluid per 3000 meters of the cable 350. In some embodiments, the flow 806 of the fluid may occur in intermittent pulses instead of a continuous flow to conserve the fluid.

In some embodiments, the source 804 includes the fluid that may be a mixture and that may be non-hydrogen containing. As size of the paths 119, 121 in the cable 350 through which the fluid is flowing decreases, liquids become more difficult to circulate making gases more desirable in some applications. Exemplary gases for the fluid in the source 804 include air, nitrogen, helium, fluorine, argon, oxygen, neon, krypton, xenon, radon, carbon monoxide, carbon dioxide, and mixtures thereof. Further, the fluid from the source 804 may contain hydrogen scavenging compounds such as fullerenes including buckminsterfullerenes, carbon tetrachloride, perfluorohexane, potassium iodate, and mixtures thereof.

Figure 10:
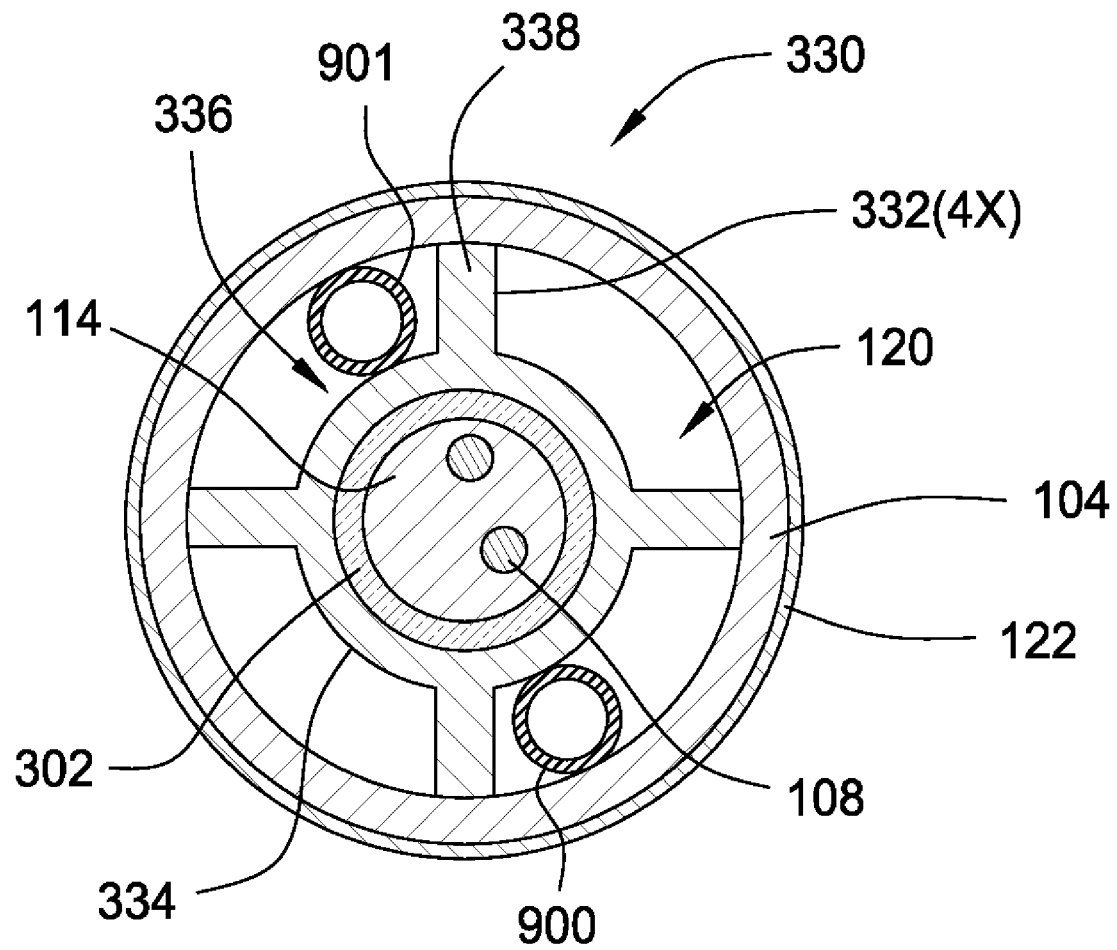
FIG. 10 is a cross sectional view of a fiber optic cable as shown in FIG. 3C with addition of flow tubes between inner and outer tubes.

FIG. 10 shows a cross sectional view of the fiber optic cable 330 as shown in FIG. 3C with addition of first and second flow tubes 900, 901 between the inner and outer tubes 302, 104. While two of the flow tubes 900, 901 are shown, the cable 330 may include any number of the flow tubes 900, 901. As described with reference to FIG. 8, flowing of fluid through one or more of the flow tubes 900, 901 and returning the fluid through the gap 120 flushes hydrogen from within the cable 330 prior to the hydrogen reaching the optical fibers 108. The flow tubes 900, 901 can withstand pressures necessary to establish circulation of the fluid. Passing the fluid inside the flow tubes 900, 901 facilitates in ensuring that a distinct and stable flow path extends across all of the cable 330 prior to the fluid being returned back through the cable 330.

Figure 11:
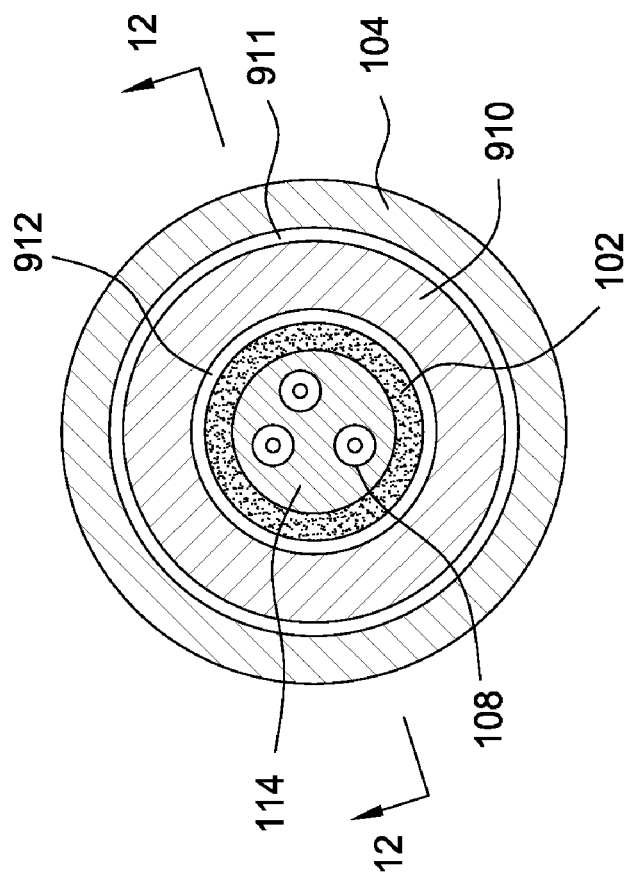
FIG. 11 is a cross sectional view of a fiber optic cable with annular flow paths.

FIG. 11 illustrates a cross sectional view of a fiber optic cable with a filler body 910 disposed between inner and outer tubes 102, 104 in a spaced relationship with both the inner and outer tubes 102, 104. In one embodiment, aluminum that may be extruded over or wrapped and welded around the inner tube 102 forms the filler body 910. In some embodiments, the inner tube 102 may be concentric with the outer tube 104 and may be made of metal. Separation between the filler body 910 and the outer tube 104 creates an outer annular flow path 911 concentric with an inner annular flow path 912 provided by spacing between the inner tube 102 and the filler body 910. The filler body 910 isolates the annular flow paths 911, 912 from one another until cross-over is desired. In some embodiments, an outer diameter of the filler body 910 being about 0.1 to 0.3 mm smaller than an inner diameter of the outer tube 104 and an outer diameter of the inner tube 102 being about 0.1 to 0.3 mm smaller than an inner diameter of the filler body 910 establish the annular flow paths 911, 912.

Figure 12:
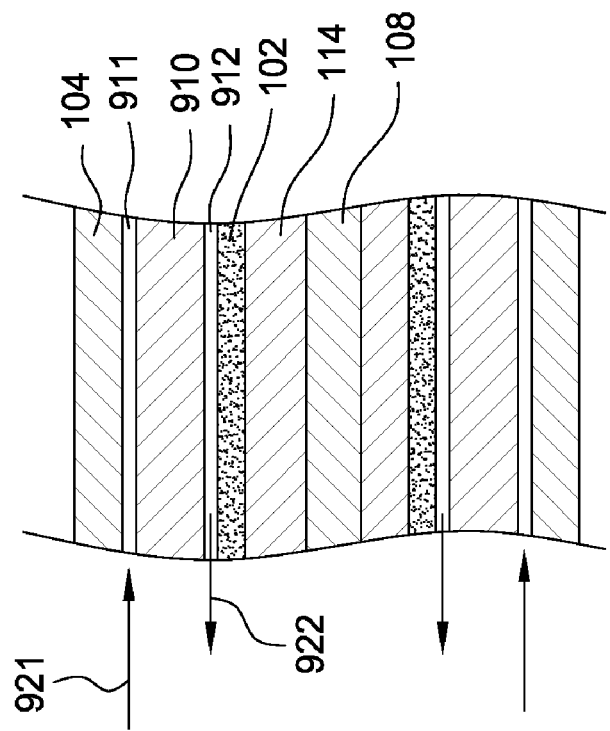
FIG. 12 is a cross sectional view of the fiber optic cable shown in FIG. 11 taken across line 12-12.

FIG. 12 shows a cross sectional view of the fiber optic cable shown in FIG. 11 taken across line 12-12. Referring again to FIG. 8, fluid flow through the annular flow paths 911, 912 removes any hydrogen that permeates through the outer tube 104 to reduce or eliminate impact of hydrogen on optical fibers 108 contained in the inner tube 102. Pressurization and return of the fluid can occur respectively through either of the annular flow paths 911, 912. For example, input flow 921 may pass through the outer annular flow path 911 for a cable length prior to being returned through the inner annular flow path 912 as depicted by return flow 922. The input and return flows 921, 922 as depicted, respectively enter and exit the outer and inner annular flow paths 911, 912, thereby illustrating, for example, the inlet and the outlet.

Figure 13:
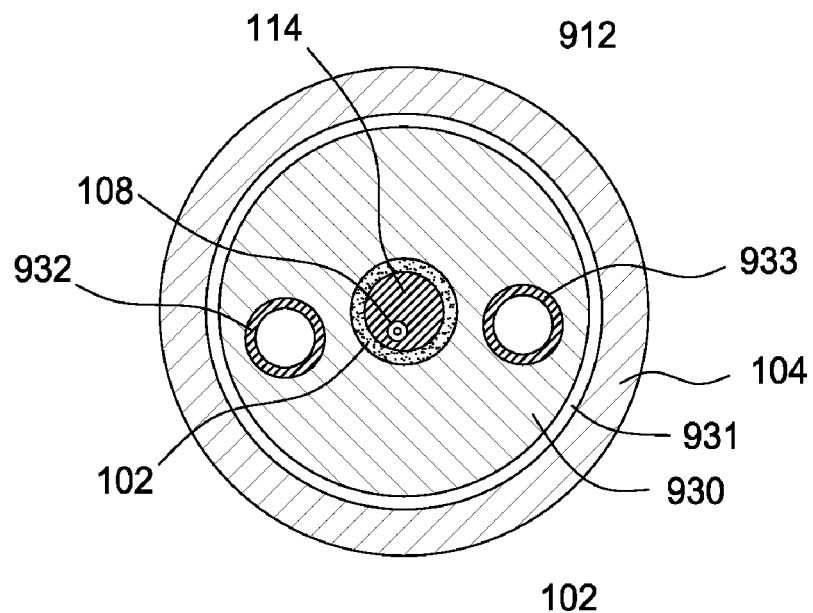
FIG. 13 is a cross sectional view of a fiber optic cable having an outer tube surrounding a body having embedded therein one or more flow tubes and one or more tubes with fibers inside.

FIG. 13 illustrates a cross sectional view of a fiber optic cable having an outer tube 104 surrounding a filler body 930, first and second flow tubes 932, 933 embedded in the filler body 930, and an inner tube 102 also embedded in the filler body 930 with fibers 108 inside the inner tube 102. For some embodiments, extrusion of aluminum over the inner tube 102 and the flow tubes 932, 933 forms the filler body 930. Centralization of the inner tube 102 within the filler body 930 prevents length mismatch between the inner and outer tubes 102, 104 as a result of coiling or uncoiling. Pressurization of the flow tubes 932, 933 with fluid at a first end of the flow tubes 932, 933 passes the fluid to a second end of the flow tubes 932, 933 where the fluid exiting the second end of the flow tubes 932, 933 is directed back along an annulus 931 between the filler body 930 and the outer tube 104. A gap between an outer diameter of the filler body and an inner diameter of the outer tube 104 creates the annulus 931, which is purged of hydrogen by the fluid that is circulated therein.

Figure 14:
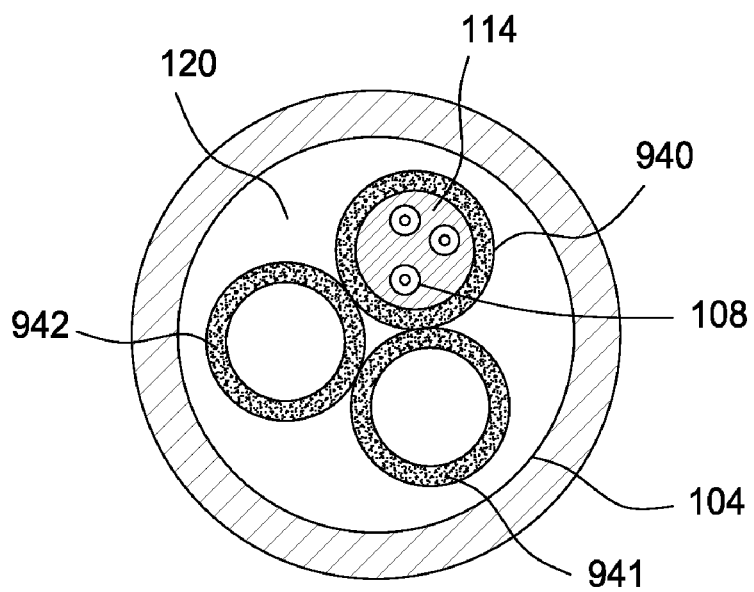
FIG. 14 is a cross sectional view of a fiber optic cable formed by an outer tube surrounding one or more flow tubes stranded with one or more tubes with fibers inside.

FIG. 14 shows a cross-sectional view of a fiber optic cable formed by an outer tube 104 surrounding first and second flow tubes 941, 942 stranded or twisted together with an inner tube 940 that has optical fibers 108 inside. The flow tubes 941, 942 and inner tube 940 for some embodiments include a coating to hold the flow tubes 941, 942 and inner tube 940 together. Gaps 120 of open space exist external to the flow tubes 941, 942 and inner tube 940 and inside of the outer tube 104. Like other embodiments described herein, flowing fluid through the flow tubes 941, 942 in a first direction along a cable length and then flowing the fluid back through the gaps 120 along the cable length in a second direction that is opposite the first direction flushes away any hydrogen gas that has migrated through the outer tube 104 before the hydrogen gas can build a partial pressure enough to penetrate the inner tube 102 containing the optical fibers 108.

Compared to designs that introduce a gas barrier in direct contact with optical fibers, embodiments of the invention provide several advantages. For example, the gas barrier in direct contact with the optical fibers requires leaving the fibers in an unsupported condition and subject to free movement. Further, purging hydrogen at the optical fiber itself means that any hydrogen in flow for the gas barrier can interact with the optical fiber as there is nothing blocking the hydrogen from access to the fibers. Redundant hydrogen barriers or hydrogen scavenging techniques on the other hand can benefit from reduced hydrogen concentrations when hydrogen is purged ahead of such redundant hydrogen barriers. Moreover, integration of purging fluid inflow and outflow in a single cable facilitates deployment of the cable. Another exemplary advantage provided by embodiments of the invention includes ability to incorporate various cable design aspects in which optical fibers are disposed without being limited to running of bare optical fibers within the gas barrier.

Based on the foregoing, various arrangements exist for providing one or more flow paths in a cable between an inner tube containing optical fibers and an outer tube surrounding the inner tube. The flow paths enable flowing of fluid to prevent hydrogen ingress to the optical fibers as exemplarily illustrated for various embodiments herein even though other configurations, such as shown in FIG. 1, may provide suitable flow paths. Although the invention has been described and illustrated with respect to exemplary embodiments thereof, the foregoing and various other additions and omissions may be made therein and thereto without departing from the spirit and scope of the present invention.

What is claimed is:

1. A method of deploying an optic cable, comprising:
providing the cable comprising an inner tube having an optical fiber disposed inside the inner tube and an outer tube with an inner diameter sized for relative retention of the inner tube disposed inside the outer tube;

positioning the cable at a location; and controlled flowing of a fluid between the inner and outer tubes to remove hydrogen from within the cable positioned at the location.

2. The method of claim 1, wherein positioning the cable includes lowering the cable into a wellbore.

3. The method of claim 1, wherein flowing of the fluid passes the fluid between the inner and outer tubes across a length of the cable in a first direction and returns the fluid between the inner and outer tubes across the length of the cable in a second direction opposite the first direction.

4. The method of claim 1, wherein the fluid comprises a gas.

5. The method of claim 1, wherein the fluid is selected from one of air, nitrogen, helium, fluorine, argon, oxygen, neon, krypton, xenon, radon, carbon monoxide, carbon dioxide, and mixtures thereof.

6. The method of claim 1, wherein the fluid comprises hydrogen scavenging compounds.

7. The method of claim 1, wherein the fluid comprises one of a fullerene, carbon tetrachloride, perfluorohexane, potassium iodate, and mixtures thereof.

8. The method of claim 1, wherein the flowing of the fluid occurs at a flow rate between 0.05 cubic meters and 1.5 cubic meters per day for a period of at least one week.

9. The method of claim 1, wherein the cable further includes gel filler material disposed inside the inner tube around the optical fiber.

10. The method of claim 1, wherein length of the optical fiber disposed inside a unit length of the inner tube is greater than the unit length.

11. An optic cable system, comprising:

a cable that includes an inner tube having an optical fiber disposed inside the inner tube and an outer tube with an inner diameter sized for relative retention of the inner tube disposed inside the outer tube, wherein a flow path disposed between the inner and outer tubes extends across a length of the cable and includes an inlet and an outlet; and a source of fluid coupled to the inlet of the flow path, wherein the fluid is pressurized to achieve controlled fluid flow of the fluid through the flow path from the inlet toward the outlet that is defined, the controlled fluid flow to remove hydrogen from within the cable.

12. The optic cable system of claim 11, wherein the flow path includes input and return paths coextensive along the length but separated along part of the length from one another, the inlet configured to introduce the fluid from the source into the input path and the outlet configured to receive from the return path the fluid introduced at the inlet.

13. The optic cable system of claim 11, wherein the flow path includes first and second annular paths coextensive along the length but separated along part of the length from one another, the inlet configured to introduce the fluid from the source into the first annular path and the outlet configured to receive the fluid exiting the cable from the second annular path.

14. The optic cable system of claim 13, wherein a tubular aluminum body disposed between the inner and outer tubes is sized to form the annular paths between the aluminum body and the inner tube and the aluminum body and the outer tube.

15. The optic cable system of claim 11, further comprising a flow tube stranded with the inner tube, wherein the inlet introduces the fluid from the source into the flow tube and the outlet receives the fluid introduced at the inlet and returned via a gap between an interior of the outer tube and exteriors of the inner and flow tubes.

16. The optic cable system of claim 11, further comprising a gel filler material disposed inside the inner tube around the optical fiber.

17. The optic cable system of claim 11, wherein length of the optical fiber disposed inside a unit length of the inner tube is greater than the unit length.

18. The optic cable system of claim 11, further comprising a flow control device configured to maintain flowing of the fluid from the source through the flow path for a period of at least one week.

19. A method of deploying an optic cable, comprising:

providing the cable comprising an inner tube having an optical fiber disposed inside the inner tube and an outer tube with an inner diameter sized for relative retention of the inner tube disposed inside the outer tube;

lowering the cable into a wellbore; and removing hydrogen from within the cable while located in the wellbore by circulating a fluid between the inner and outer tubes.

20. The method of claim 19, wherein the fluid comprises a gas and the inner and outer tubes are made of metal.

* * * * *